United States Patent [19]

Lawson

[11] 4,340,178

[45] Jul. 20, 1982

[54] THRUST REVERSER - CASCADE TYPE

[75] Inventor: Dale W. R. Lawson, Bonita, Calif.

[73] Assignee: Rohr Industries, Inc., Chula Vista, Calif.

[21] Appl. No.: 146,509

[22] Filed: May 5, 1980

[51] Int. Cl.³ .............................................. B64D 33/04
[52] U.S. Cl. ............................ 239/265.31; 239/265.39
[58] Field of Search ...................... 239/265.39, 265.33, 239/265.37, 265.19, 265.27, 265.29, 265.31; 60/230, 232; 244/110 R, 110 B

[56] References Cited

U.S. PATENT DOCUMENTS

| | | | |
|---|---|---|---|
| 2,950,595 | 8/1960 | Laucker et al. | 239/265.31 |
| 3,434,666 | 3/1969 | Shaw | 239/265.31 X |
| 3,616,648 | 11/1971 | Weise | 239/265.31 X |
| 4,185,798 | 1/1980 | Dickenson | 239/265.29 X |

*Primary Examiner*—Robert B. Reeves
*Assistant Examiner*—Gene A. Church
*Attorney, Agent, or Firm*—Patrick J. Schlesinger; Frank D. Gilliam

[57] ABSTRACT

A thrust reverser for a fan jet engine. The engine has a primary nozzle for the rearward passage of primary gases and a fan associated therewith. An aerodynamically streamlined cowl surrounds the fan and is spaced from the primary nozzle. Space therebetween forming a fan nozzle for the passage of fan gases. The cowl has a fixed forward section and a translatable aft portion. Stowed the aft section abuts the forward section and forms a continuous inner and outer flow surface and when translated rearward to a deployed position an opening is formed between the sections. A pair of blocker doors are each rotatably connected to the forward cowl section through a pair of longitudinally translatable pivots. The pivots are normally biased in a forward position by a biasing spring. Links are pivotably attached between the blocker doors and the aft cowl section. When the after section is translated aft the links allow the pivots to travel rearward under the influence of the spring and then rotate the blocker doors into the gas streams for redirecting the flow of the gas streams through the opening. When the aft cowl section returns to its forward stowed position the pivots translate forward against the spring bias by the link action until they reach the forwardmost position then the blocker doors are rotated out of the gas streams. Actuators are provided for translating the aft cowl section.

5 Claims, 4 Drawing Figures

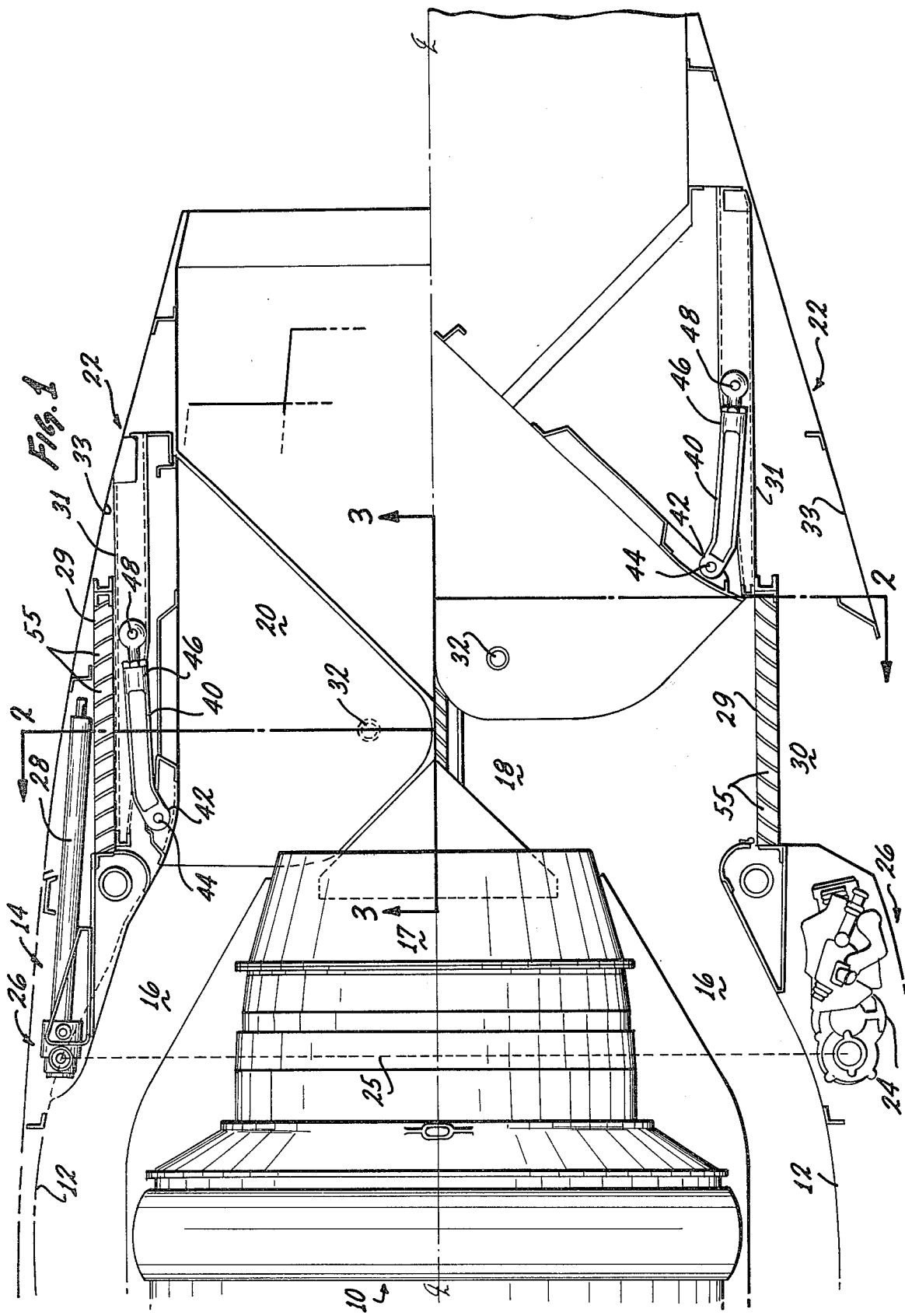

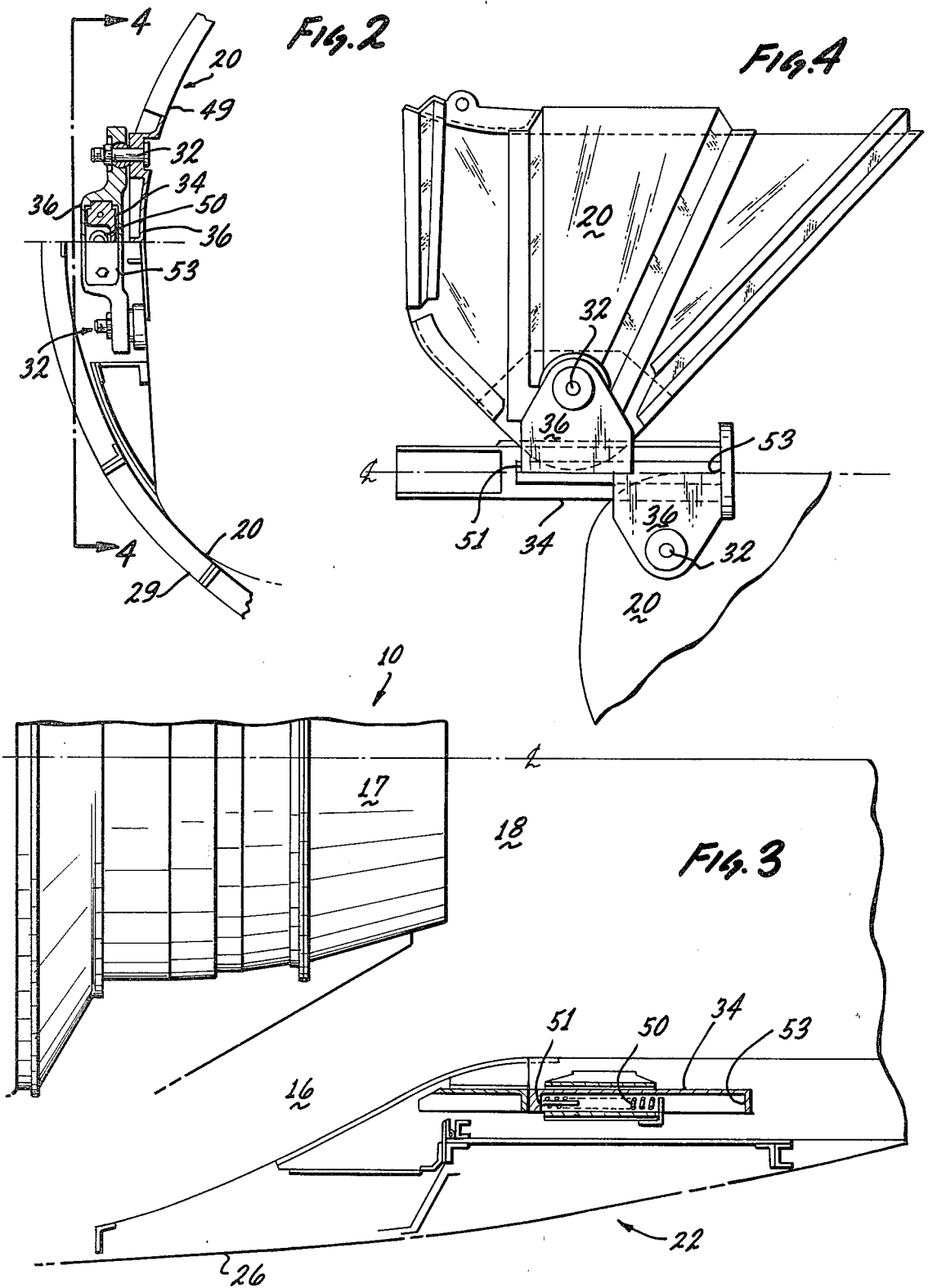

THRUST REVERSER - CASCADE TYPE

BACKGROUND OF THE INVENTION

This invention relates generally to thrust reversers for bypass fan type jet propulsion engines and more particularly to improvements therein.

Various thrust reversers of a similar type have heretofore been provided in which a translatable fan cowl section is translated rearward to expose a ring of reversing cascades which the normally rearward directed engine gases flow through when the exit nozzle is blocked by blocker doors or flaps which have been rotated into position. Generally, such prior art reversers have been suitable for the purpose intended; they have several structural and functional limitations imposed by their specific structure and combination of parts employed to accomplish the reverser function without compromising any of the aerodynamic characteristics, performance and function desired of the engine. Their principle restrictions have been costs, excess weight for small personal aircraft and complexity of operation with resultant high maintenance expense.

SUMMARY OF THE INVENTION

The present invention obtains the various benefits of the prior art devices with a reduction of economic costs, weight and complexity. Generally stated, the apparatus of the instant invention includes an elongated cowl section which surrounds the engine and provides an angular duct therebetween for directing the rearward flow of fan air, the duct terminating at the engine nozzle. The cowl is divided into a forward fixedly position section and an aft rearwardly translatable section. When the aft section is stowed it defines a streamlined continuation of the forward section and when deployed rearward, it defines the peripheral outflow passage communicating with both the primary nozzle and fan duct.

A pair of blocker doors are attached to the forward cowl section through a translatable pivot and inter-connected through actuating links to the aft cowl section. When the aft cowl section is translated rearward, first the blocker doors rotate clockwise into the combined fan and primary gas stream and then secondly, the translatable pivot is pulled to its extreme aft position to provide additional exit area. A ring of reverser cascades are fixedly attached to the aircraft structure and extend rearward from the forward cowl section for filling the peripheral outflow passage when the aft cowl section is deployed rearward. The cascade ring nests between the inner and outer walls of the aft cowl section when the aft cowl section is in its forward stowed position.

The translatable pivot connection between the forward cowl section and the blocker doors is spring biased toward its extreme forward stowed position so that when the aft cowl section is translated rearward the spring bias maintains the pivot connection in a maximum forward position until the blocker doors are fully deployed, at which time the pivot connection is pulled against the spring bias to its maximum aft position, and when the aft cowl section is translated forward the spring bias first translates the pivot connection to its forwardmost position and then the blocker doors rotate and return to their stowed position.

Suitable well known actuator means are provided to translate the aft cowl section. The reversing of the direction of translation of the aft cowl section returns the respective elements to their normal flight stowed positions.

The mechanism is simple to construct and service, light in weight because of the few elements utilized for its operation and provides for a positive and effective reversal of rearward thrust.

The above and other specific features of the instant invention will be readily apparent as the description continues are being read in conjunction with the appended drawings.

BRIEF DESCRIPTION OF THE DRAWINGS

FIG. 1 is the partial cut away showing of the rear portion of the fan jet engine with the upper portion showing a blocker door in a stowed position and the lower portion showing a blocker door in a deployed position.

FIG. 2 is a showing of FIG. 1 taken along line 2—2.
FIG. 3 is a showing of FIG. 1 taken along line 3—3.
FIG. 4 is a showing of FIG. 2 taken along line 4—4.

DETAILED DESCRIPTION OF THE PREFERRED EMBODIMENT

Throughout the drawings and specifications, the same reference numerals are used to depict the identical part or element.

Referring now to the various Figs., a rear portion of the fan jet aircraft engine 10, is shown spaced from the inner surface or wall 12 of cowl 14. This space between the engine and the inner wall of the cowl defines a fan duct 16. This fan duct provides the rearward path for the engine fan gases under normal flight configuration of the aircraft on which the engine is mounted. Immediately aft of the combustion chamber 17 of the engine 10 the engine primary and fan gases are mixed in a mixing chamber 18. Here both fan and primary gases from the engine 10 are substantially mixed prior to their exiting the aft cowl 14.

FIG. 1, shows the thrust reversing apparatus for combined fan air and engine exhaust gas reversing. The engine portion above the center line C shows one reverser or blocker door 20 in its normal flight stowed or cowl nested position. The engine portion below the center line C shows one reverser or blocker door 20 in its deployed combined fan and exhaust gas reversing position.

The rear cowl section 22 of cowl 14 translates rearward from its normally stowed position, shown in the upper half of FIG. 1. The translation of the aft cowl portion 22 is accomplished by a common centrally located drive motor 24 which drives a flexible shaft 25 which surrounds and is positioned within the inner walls of the forward fixed cowl section 26, its path shown in FIG. 1. This flexible shaft 25 interconnects each of a plurality of screwdrive actuators 28, one shown. Typically three actuators 28 are utilized to translate the entire rear cowl portion 22. It should be understood that more or less actuators may be utilized depending on the size and weight of the cowl sections 22. The screw actuators may, of course, be substituted with any other commonly known translating means which would be suitable for the purpose described.

A cascade ring 29 is fixedly attached to the aft end of the forward fixed cowl section 26 and extends rearward into and between the inner wall 31 and outer wall 33 of the rear cowl section 22 when the rear cowl section is in its forwardmost stowed position. Thus the cascade ring 29 is out of the normal rearward gas flow when the reverser doors 20 are in their normally stowed position. When the rear cowl section is translated aft to a reversing position the cascade ring 29 is exposed within the opening 30 between the cowl sections 22, 26 wherein they serve to turn the normally rearward directed engine gases in a sufficiently forward direction to provide the desired reverse thrust.

The blocker doors 20 are pivotally attached at pivot connection 32 to bracket 36 (FIG. 4) which in turn slidably engages track 34. The track forward end is supported by the fixed cowl 26 (FIG. 3). The reverser doors 20 are connected to the aft cowl section 22 by inner connecting links 40 (FIG. 1). The forward end 42 of each link 40 is pivotably connected through a pivot 44 to a blocker door and the aft end 46 of each link 40 is pivotally connected through a pivot 48 to the aft cowl portion 22. The aft end 46 of each link is adjustable in length through a threaded connection (not shown) to the link and is locked at a selected length by lock nut 47.

Referring now specifically to FIG. 2, this Fig. depicts a side partial cut away view of FIG. 1 clearly showing the upper reverser door 20 in its normally stowed position and a showing of the lower door 20 in its deployed position (both showings fragmentary). The inner surface 49 of the upper door 20 clearly defines the gas flow boundary for the normal rearward flow of engine gases. The pivots 32, upper and lower, and the track 38 which carry brackets 36 are more clearly shown.

Fig. 4 is an enlarged showing of a section of FIG. 2 taken along line 4—4. This Fig. provides a clear partial showing of the reverser doors 20, the upper door being shown in its stowed position and the lower door shown in a fully deployed or reverse thrust position, the brackets 36, the bracket to reverser door pivots 32 and the bracket engaging track 34.

Referring now to FIGS. 3 and 4, a coil spring bias 50 is shown positioned within the track 34. This spring bias 50 is retained by bracket 36 and provides a spring bias resistance to the translation of pivot 32 to the rearward stop 53 attached to track 34 and returns the pivot 32 to the forward end 51 of track 34.

OPERATION OF THE PREFERRED EMBODIMENT

When the reverser doors 20 are in a normally stowed position, as shown in the upper one-half of FIG. 1, the combined engine gases exit to the rear of the cowling 14 in a normal forward thrust producing direction. If combined engine gas reversing is desired, the motor 24 is activated, operating actuators 28 through interconnecting flexible shaft 25, causing the aft cowl section 22 to translate rearwardly. Links 40 pull the reverser door 20 which cause their clockwise rotation from their stowed or nested position to their deployed gas flow blocking position, as shown in the lower half of FIG. 1. The reverser door rotation is completed during a first portion of the rearward translation of the aft cowl section 22. During the final position of the rearward translation of the aft cowl section 22 the brackets 36 carrying pivots 32 are caused to translate from their normally stowed positions at the forward end 51 of track 34 to their fully aft position against stop 53 and against the bias of the spring bias means 50. The translation of the pivot in this manner causes the blocker doors to move sufficiently aft to provide a reverser thrust effective cascade exit area that is equivalent to the forward thrust tailpipe exit area. When the translation direction of the aft cowl section 22 is reversed, to a forward direction, the spring bias means 50 causes the brackets 36 carrying pivots 32 to return to the forward end 51 of track 34. The reverser doors 20 then rotate counter clockwise back to their stowed or nested position.

It should be noted that when the blocker doors 20 are in their fully deployed aft position that the combined mixture of engine and fan gases exit the engine through the slots 55 of cascade ring 29 (FIG. 1) thereby substantially reversing the normal rearward thrust flow of engine gases.

Many changes may be made in detail of the instant invention and the method and materials of fabrication, in the configuration and assemblage of the constituent elements without departing from the spirit and scope of the appended claims, which changes are intended to be embraced therewithin.

Having thus described the invention, what is claimed as new and useful and desired to be secured by United States Letter Patent is:

1. In a fan jet engine having a primary nozzle for the rearward passage of primary gases and a fan concentric therewith, thrust reverser mechanism comprising:

a cowl surrounding said fan and spaced from said primary nozzle to form a fan nozzle for the passage of fan gases, said cowl having a fixed forward section and a translatable aft section, when stowed the aft section forms with the fixed forward cowl section a continuous inner and outer flow surface and when the aft section is translated rearward to its deployed position an opening is provided between said cowl sections;

a pair of blocker doors are rotatably connected to said forward cowl section by translatable pivots;

bias means for biasing said pivots toward a maximum forward position;

link means pivotably attached between said blocker doors and the aft cowl section for rotating said blocker doors from a stowed position into the stream of said gases and redirecting their flow through said opening and translating said pivots to a maximum aft position against said bias means when said aft cowl section is translated aft and allowing said bias means to return said pivots to a maximum forward position and then rotating said blocker doors out of the gas stream as said aft section is translated in a forward direction to its stowed position; and means for translating said aft cowl section between stowed and deployed positions.

2. The invention as defined in claim 1 wherein a reversing cascade is positioned within said opening.

3. The invention as defined in claim 1 wherein said bias means are coil springs.

4. The invention as defined in claim 1 wherein said means for translating comprises three actuators interconnect for uniform operation and driven by a single drive motor.

5. The invention as defined in claim 1 wherein said link means are length adjustable.

* * * * *